(12) United States Patent
Ishioka et al.

(10) Patent No.: US 7,534,518 B2
(45) Date of Patent: May 19, 2009

(54) CELL FOR SOLID POLYMER ELECTROLYTE FUEL CELL WITH IMPROVED GAS FLOW SEALING

(75) Inventors: Yutaka Ishioka, Nagoya (JP); Yasuhiko Mihara, Nagoya (JP); Ryo Hirai, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 734 days.

(21) Appl. No.: 11/188,801

(22) Filed: Jul. 26, 2005

(65) Prior Publication Data

US 2006/0024556 A1    Feb. 2, 2006

(30) Foreign Application Priority Data

Jul. 29, 2004    (JP)    ............... 2004-221630

(51) Int. Cl.
  *H01M 2/02*    (2006.01)
  *H01M 2/08*    (2006.01)
(52) U.S. Cl. ............... 429/34; 429/36; 429/30; 429/38
(58) Field of Classification Search ............ 429/30, 429/34, 35, 36, 38, 39, 37
  See application file for complete search history.

(56) References Cited

U.S. PATENT DOCUMENTS

| | | | |
|---|---|---|---|
| 6,316,139 B1 | 11/2001 | Uchida et al. | |
| 6,440,597 B1 | 8/2002 | Mizuno | |
| 2002/0034670 A1 | 3/2002 | Suenaga et al. | |
| 2002/0086196 A1 | 7/2002 | Utsunomiya et al. | |
| 2002/0102453 A1 | 8/2002 | Suenaga et al. | |
| 2002/0187384 A1 | 12/2002 | Kato et al. | |
| 2004/0121215 A1* | 6/2004 | Fujii et al. | ............ 429/35 |

FOREIGN PATENT DOCUMENTS

| | | |
|---|---|---|
| EP | 1 341 249 A | 9/2003 |
| JP | A 2002-83610 | 3/2002 |

* cited by examiner

*Primary Examiner*—Raymond Alejandro
(74) *Attorney, Agent, or Firm*—Oliff & Berridge, PLC

(57) ABSTRACT

A cell for use in a solid polymer electrolyte fuel cell, including a membrane electrode assembly including a fuel electrode and an oxidant electrode disposed on either side of a solid polymer electrolyte membrane, the assembly being sandwiched from either side by a first separator and a second separator to give a stacked construction. The first and second separator have a planar shape slightly larger than a solid polymer electrolyte membrane, with primary face seal rubber layers affixed to outer peripheral edge portions of primary faces of the first and second separator. Thus, an outer peripheral edge portion of the solid polymer electrolyte membrane projecting outwardly beyond the fuel and oxidant electrodes are held clamped fluid-tightly between the first and second separators by means of the primary face seal rubber layers of the first and second separators.

6 Claims, 7 Drawing Sheets

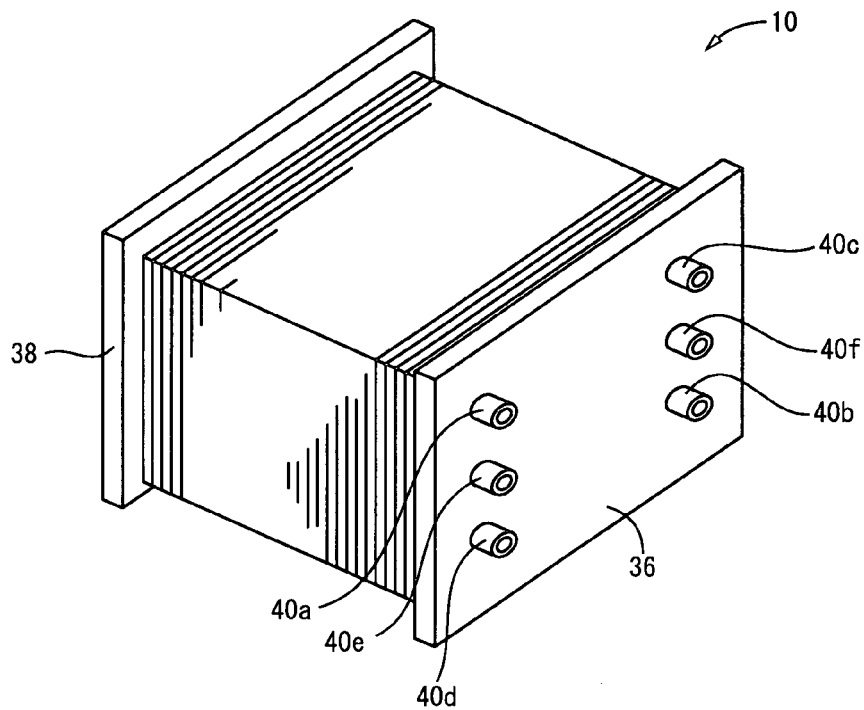
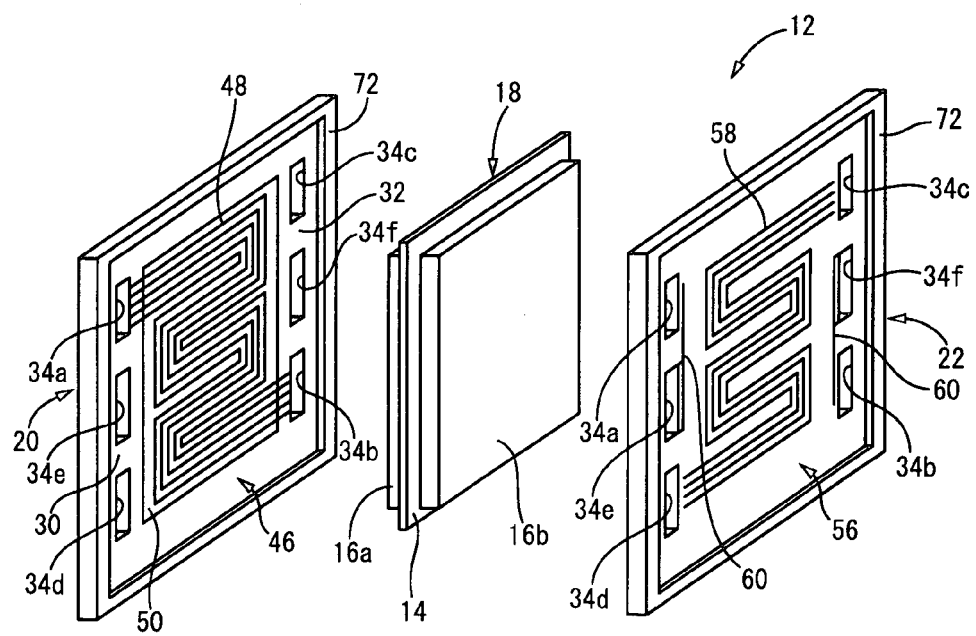

CELL FOR SOLID POLYMER ELECTROLYTE FUEL CELL WITH IMPROVED GAS FLOW SEALING

INCORPORATED BY REFERENCE

The disclosure of Japanese Patent Application No. 2004-221630 filed on Jul. 29, 2004 including the specification, drawings and abstract is incorporated herein by reference in its entirety.

BACKGROUND OF THE INVENTION

1. Field of the Invention

The present invention relates in general to a cell for use in a solid polymer electrolyte fuel cell that employs a solid polymer electrolyte membrane, and more particular to a cell for a solid polymer electrolyte fuel cell of novel construction that affords a high level of gas flow path sealing functionality within the cell by means of a simple construction.

2. Description of the Related Art

As is well known, solid polymer electrolyte fuel cells are able to produce electrical power by means of an electrochemical reaction when supplied with oxygen (air) as an oxidant and hydrogen as a fuel, these being supplied onto the surfaces of a pair of catalyst electrodes superposed against either face of an electrolyte which is a solid polymer electrolyte membrane, such as a solid ion exchange membrane or the like.

In solid polymer electrolyte fuel batteries, it is important that there be consistent supply of oxygen and hydrogen onto the surfaces of the catalyst electrodes in order to consistently and efficient produce the intended voltage. It is also important for the appropriate temperature to be maintained.

Accordingly, there is typically employed a cell of a structure wherein a membrane/electrode assembly (MEA) composed of a breathable porous membrane oxidant electrode and a fuel electrode disposed on either side of the solid polymer electrolyte membrane is assembled with a first separator superposed against the oxidant electrode face thereof and a second separator superposed against the fuel electrode face thereof. A plurality of such unit cells are stacked and electrically connected directly to produce the desired voltage.

An oxidant gas flow passage is formed by means of covering with the oxidant electrode a recess disposed on the first separator, and fuel gas flow passage is formed by means of covering with the fuel electrode a recess disposed on the second separator. A coolant flow passage is formed by a recess disposed in a secondary face of the first separator or second separator on the back side from a primary face which is superposed against the electrode, by covering the recess with the secondary face of another adjacent cell.

At respective peripheral edges of stacked unit cells, there are formed perforating therethrough in the stacking direction an oxidant gas inlet and an oxidant gas outlet, a fuel gas inlet and a fuel gas outlet, and a coolant inlet and a coolant outlet. Oxidant gas, fuel gas, and coolant supplied through these inlets and outlets are circulated the aforementioned oxidant gas flow passages, fuel gas flow passages, and coolant flow passages of the unit cells, and are discharged from the outlets (see JP-A-2002-83610, for example).

Here, the form of the oxidant gas flow passages and fuel gas flow passages has an important effect on efficiency and stability of power generation. Particularly in recent years, with the object of rapidly discharging the water which forms so as to prevent it from collecting, as well as to improve the efficiency of the electrochemical reaction, the pressure of the gases in the flow channels are sometimes set to high levels.

In solid polymer electrolyte fuel cells of conventional construction, it was difficult to ensure consistent sealing of the oxidant gas flow passage and the fuel gas flow passage that are formed on the superposed faces of the first separator and the second separator on either side of the membrane/electrode assembly. Thus, there was a risk that, for example, oxidant gas flowing to one side of the membrane/electrode assembly and fuel gas flowing to the other side could leak around the peripheral edge of the membrane/electrode assembly, resulting in problems such as power generation failure or abnormal generation of heat.

In view of such problems, unit cells of conventional design involve a separate seal rubber disposed between stacked elements (i.e. between the opposed faces of the first separator and the second separator against the membrane/electrode assembly). However, not only did including separate seal rubber components increase the number of parts and the number of assembly steps, but it was also difficult to position the seal rubber with accuracy.

When manufacturing cells for a solid polymer electrolyte fuel cell, it is necessary to superpose the first separator and the second separator against either face of the membrane/electrode assembly, but since the membrane/electrode assembly is difficult to handle due to its extreme thinness and low strength, there was also the problem of difficultly in correctly aligning the membrane/electrode assembly within the opposed faces of the first separator and the second separator.

In particular, the primary faces of the first and second separators have gas flow passages formed thereon, and at least one of the secondary faces has a coolant recess formed thereon. Therefore, if placement of the first and second separators should be misaligned with respect to the membrane/electrode assembly, for structural reasons, the intended gas flow passages or coolant flow passage will not be formed correctly, and in some instances may result in a drop in power generating ability or in gas leakage.

SUMMARY OF THE INVENTION

It is therefore one object of this invention to provide a cell of novel construction for use in a solid polymer electrolyte fuel cell, whereby it is possible to provide a consistently high level of sealing in the oxidant gas flow passage and the fuel gas flow passage which are formed between the opposed faces of the MEA and the first and second separators.

According to sixth and seventh modes of the invention that will be described hereinafter in particular, it is also an object to provide a cell of novel construction for use in a solid polymer electrolyte fuel cell, whereby during manufacture it is possible to position the MEA within the opposed faces of the first separator and the second separator easily and with a high degree of accuracy, without any increase in the number of special parts or the number of assembly steps.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a cell for use in a solid polymer electrolyte fuel cell includes: a membrane/electrode assembly including a fuel electrode and an oxidant electrode disposed on either side of a solid polymer electrolyte membrane, the assembly being sandwiched from either side by a first separator and a second separator to give a stacked construction; a fuel gas flow passage formed between opposed faces of the fuel electrode and the first separator; and an oxidant gas flow passage formed between opposed faces of the oxidant electrode and the second separator. The solid polymer electrolyte membrane in the membrane/electrode assembly has a planar shape slightly larger than the fuel electrode and the oxidant electrode so that an entire perimeter of an outer peripheral edge portion of the solid polymer electrolyte membrane projects outwardly beyond outer peripheral edges of the fuel electrode and the oxidant electrode. The first separator and the second separator have a planar shape slightly larger than the solid polymer electrolyte membrane, with primary face seal rubber layers being affixed to outer peripheral edge portions of the primary faces of the first and second separator superposed against the membrane/electrode assembly, whereby the outer peripheral edge portion of the solid polymer electrolyte membrane projecting outwardly beyond the fuel electrode and the oxidant electrode are held clamped fluid-tightly between the first and second separator by means of inner peripheral portions of the primary face seal rubber layers of the first and second separators.

In the cell for solid polymer electrolyte fuel cells of construction according to this mode, the fuel gas flow passage formed between the opposed faces of the first separator and one face of the membrane/electrode assembly, and the oxidant gas flow passage formed between the opposed faces of the second separator and the other face of the membrane/electrode assembly, are each formed in a zone enclosed by the primary face seal rubber layers affixed to the outer peripheral edge portions of the separators. Only the solid polymer electrolyte membrane extends out beyond the zone enclosed by the primary face seal rubber layers, with the outer peripheral edge portion of the solid polymer electrolyte membrane being subjected to clamping force between the two separators and held clamped fluid-tightly between the two primary face seal rubber layers. Accordingly, it is possible to provide the fuel gas flow passage and the oxidant gas flow passage to either side of the solid polymer electrolyte membrane with a highly gastight seal, so as to effectively prevent gas leaks.

The material for the first and second separators employed in the invention is not limited in any particular way. Specifically, it is possible to use various ones such as compression-molded carbon, injection-molded conductive resin, press-molded metal materials such as stainless steel, and the like. Nor are there any limitations as regards the form and structure of the fuel gas flow passage and the oxidant gas flow passage.

The thickness dimension of the primary face seal rubber layer will preferably be established in consideration of the construction and component thickness dimensions of the membrane/electrode assembly, the separator construction, and so on, such that the fuel gas flow passage and oxidant gas flow passage are effectively formed at the opposed faces of the fuel electrode and the oxidant electrode with the first and second separators, and such that the primary face seal rubber layers abut the solid polymer electrolyte with compressive force adequate to produce effective sealing.

A second mode of the invention provides a cell for a solid polymer electrolyte fuel cell according to the first mode, wherein the first separator and as the second separator are metal separators, with the primary face seal rubber layers being vulcanization bonded to the metal separators, respectively.

In the cell for the solid polymer electrolyte fuel cell of construction according to this mode, by fabricating the first and second separators of metal, it is possible to ensure high strength as compared to separators using carbon or the like. Thus, the required strength can be ensured while making the first and second separators sufficiently thin. Additionally, metal separators have better conductivity than separators of carbon or the like. Thus, by employing metal separators, it is possible to ensure adequate strength, while achieving a more compact, high performance fuel cell.

Additionally, metal separators have much higher heat resistance temperatures than resin or carbon, thus avoiding problems such as heat-induced deformation or shrinkage.

Additionally, metal is easy to reuse, by means of recycling or the like.

A third mode of the invention provides a cell for a solid polymer electrolyte fuel cell according to the aforesaid first or second mode, wherein at least one of the first separator and the second separator includes a secondary face seal rubber layer affixed to a secondary face on a back side from the primary face, and a plurality of connecting holes formed penetrating through the thickness of the at least one of the first separator and the second separator so that the primary face seal rubber layer and the secondary face seal rubber layer are linked and unified through the connecting holes.

In the cell for the solid polymer electrolyte fuel cell of construction according to this mode, the primary face seal rubber layer and the secondary face seal rubber layer are linked and unified through a plurality of connecting holes formed in the first separator and/or second separator, whereby the seal rubber layers as a whole may be endowed with large adhesion area to the first and/or second separator, increasing the adhesive strength of the seal rubber layers to the first and/or second separator.

Additionally, during injection molding of extremely thin seal rubber layers, the narrow mold cavity can be consistently and reliably filled with rubber material, avoiding problems such as improper filling or the like.

A fourth mode of the invention provides a cell for a solid polymer electrolyte fuel cell according to any one of the aforesaid first through third modes, wherein the secondary face seal rubber layer is formed on both the first separator and the second separator; on the secondary faces of the first and second separators is formed a coolant flow passage forming portion for forming a coolant flow passage by means of being superposed to one another; and an insulating rubber layer that covers a surface of the coolant flow passage forming portion is formed integrally joined to the secondary face seal rubber layer.

In the cell for the solid polymer electrolyte fuel cell of construction according to this mode, the coolant flow passage forming portion for forming the coolant flow passage is disposed on the secondary faces of the first and second separators. This arrangement makes it possible to effectively carry out temperature regulation of the cell for the solid polymer electrolyte fuel cell, thus achieving improved generation efficiency.

Additionally, by forming a secondary face seal rubber layer on both the first separator and the second separator, and covering the surface of the coolant flow passage forming portion with an insulating rubber layer, the coolant flow passage can be insulated from the first separator and the second separator by means of the insulating rubber layer. Thus, dissipation into the coolant of power generated by the solid polymer electrolyte fuel cell can be reduced.

While the secondary face seal rubber layer is formed on both the first separator and the second separator, the secondary face seal rubber layer is not formed so as to cover the entire secondary face of the first separator and second separator. That is, since the first separator and second separator must be superposed in an electrically continuous state so as to be able to draw from the solid polymer electrolyte fuel cell the total voltage of the voltages produced by each cell, in no instance is the entire surface of the secondary face insulated by being covered with the seal rubber layer.

A fifth mode of the invention provides a cell for a solid polymer electrolyte fuel cell according to any one of the aforesaid first through fourth modes, wherein at least one of the first separator and the second separator includes a recess extending to open onto the primary face, with the recess covered by the fuel electrode or the oxidant electrode of the membrane/electrode assembly to form the fuel gas flow passage or the oxidant gas flow passage; an end of the gas flow passage or the oxidant gas flow passage is extended outwardly beyond the outer peripheral edge portion of the solid polymer electrolyte membranes of the membrane/electrode assembly to form a connecting recess connected with the fuel gas or oxidant gas inlets and outlets formed perforating the first separator and the second separator in a stacking direction; and the primary face seal rubber layer is formed so as to extend continuously in a recess width direction straddling the opening of the connecting recess to give the connecting recess a tunnel structure.

In the cell for the solid polymer electrolyte fuel cell of construction according to this mode, sealing by the seal rubber layer can be advantageously assured even in the recess formation area, without the need for a separate plate member to cover the recess, for example. The seal rubber layer is affixed to the metal separator, preferably vulcanization bonded to the primary face of the metal separator. Accordingly, problems such as leakage caused by gas infiltrating the gap between the seal rubber layer and the metal separator are prevented. Since the seal rubber layer straddling the recess opening is affixed to the metal separator to either side of the recess, compressive force during sealing is advantageously assured not only by simple elasticity in the shear direction, but also by elasticity in the tensile direction.

A sixth mode of the invention provides a cell for a solid polymer electrolyte fuel cell according to any one of the aforesaid first through fifth modes, wherein at least one of the outer peripheral edges of the fuel electrode and the oxidant electrode in the membrane/electrode assembly are abutted by the inner peripheral edges of the primary face seal rubber layer formed on at least one of the primary face of the first separator and the second separator, so as to be aligned with one other in a opposed face direction orthogonal to an stacking direction of at least one of the first separator and the second separator against the membrane/electrode assembly.

In the cell for the solid polymer electrolyte fuel cell of construction according to this mode, when constructing the cell for the solid polymer electrolyte fuel cell by sandwiching the membrane/electrode assembly from either side with the first separator and the second separator, the membrane/electrode assembly can be easily positioned at the desired location on the primary faces of the first separator and the second separator. Accordingly, the fuel gas flow passage and the oxidant gas flow passage can be formed in the desired mode between the opposed faces of the membrane/electrode assembly and the first separator and second separator, and reliable sealing ability can be obtained by means of the solid polymer electrolyte membrane of the membrane/electrode assembly being held sandwiched between the primary face seal rubber layers formed on the separators.

A seventh mode of the invention provides a cell for a solid polymer electrolyte fuel cell according to any one of the aforesaid first through sixth modes, wherein an end face of an inner peripheral edge portion of the primary face seal rubber layer is constituted as a sloping guide face sloping out towards an outer peripheral side of at least one of the first separator and the second separator going further away from the primary face of at least one of the first separator and the second separator.

In the cell for the solid polymer electrolyte fuel cell of construction according to this mode, by making the end face of the inner peripheral edge portion of the primary face seal rubber layer a sloping face, guide functionality during stacking can be improved while ensuring positioning accuracy, so that the stacking procedure can be carried out easily.

As will be apparent from the preceding description, in the cell for the solid polymer electrolyte fuel cell of construction according to the present invention, the solid polymer electrolyte membrane planar has a shape slightly larger than the fuel electrode and the oxidant electrode, and both the first separator and the second separator planar have a shape slightly larger than the solid polymer electrolyte membrane. Therefore, with the membrane/electrode assembly held sandwiched fluid tightly by the primary face seal rubber layers formed in the outer peripheral portion of the primary face of each separator, a high level of sealing ability may be consistently assured in the fuel gas flow passage and the oxidant gas flow passage.

Additionally, in the sixth and seventh modes of the invention in particular, by means of abutting the outer peripheral edge portion of the fuel electrode and/or the oxidant electrode against the inner peripheral edge portion of the seal rubber layers formed in the outer peripheral portion of the primary face of the first separator and/or second separator, it is possible to effect positioning of the membrane/electrode assembly within the superposed faces of the first separator and second separator easily and with a high degree of accuracy, without any increase in the number of special parts or the number of assembly steps.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein:

FIG. 1 is a perspective view of a solid polymer electrolyte fuel cell composed of cells of construction according to a first embodiment of the present invention;

FIG. 2 is an exploded perspective view showing a construction of a unit cell of the solid polymer electrolyte fuel cell of FIG. 1;

DETAILED DESCRIPTION OF PREFERRED EMBODIMENTS

Figure 3:
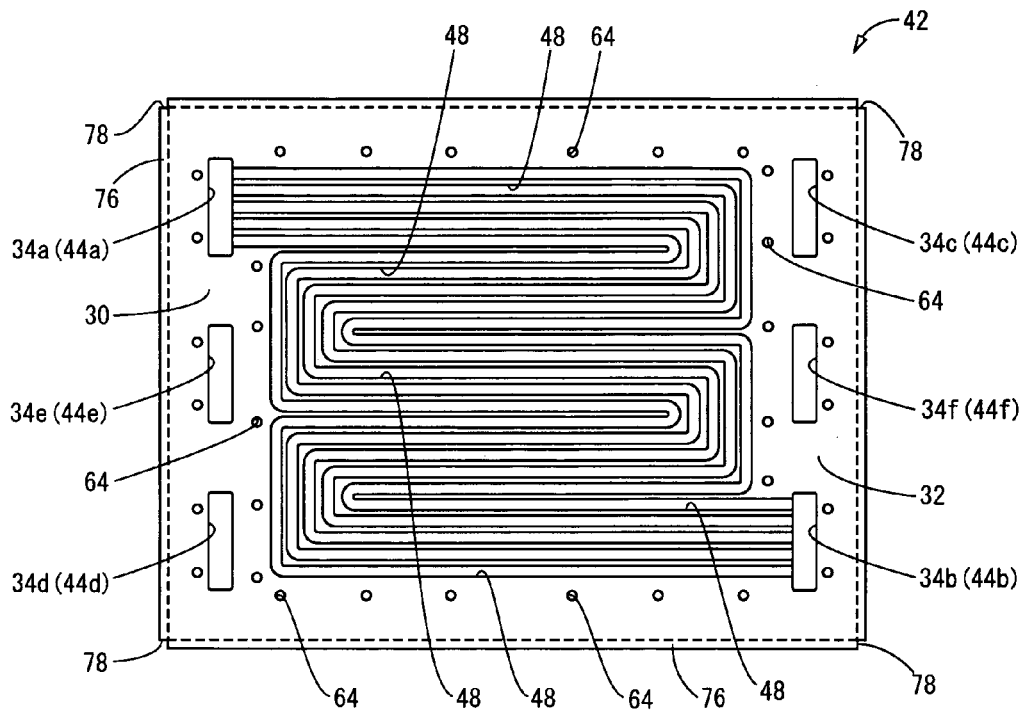
FIG. 3 is a side elevational view showing a primary face of a separator of the solid polymer electrolyte fuel cell of FIG. 1.

A simplified perspective view of a solid polymer electrolyte fuel cell (PEFC) 10 composed of a stack of multiple unit cells 12 constructed according to the invention is depicted in FIG. 1. The solid polymer electrolyte fuel cell 10 depicted in FIG. 1 is arranged with the vertical and sideways directions in the illustrated state aligned with the plumb-bob vertical and horizontal directions. In the description hereinabove, as a general rule, the vertical and sideways directions, and plumb-bob vertical and horizontal directions, refer to those in the state illustration in FIG. 1.

More specifically, as shown in FIG. 2, the unit cells 12 making up the solid polymer electrolyte fuel cell 10 comprise a membrane/electrode assembly (MEA) 18 having as the electrolyte a solid polymer membrane 14 as a solid polymer electrolyte membrane such as a solid ion exchange membrane with a fuel electrode 16a and an oxidant electrode 16b as a pair of catalyst electrodes superposed to either side thereof and joined and unified therewith. A first separator 20 and a second separator 22 are superposed to either side of this membrane/electrode assembly 18 in a sandwich configuration. By stacking a plurality of unit cells 12 in the thickness direction, there is composed a cell stack that constitutes the main body of the solid polymer electrolyte fuel cell 10.

According to the known art, the fuel electrode 16a and an oxidant electrode 16b contain a platinum catalyst, and are formed, for example, from carbon or other conductive material, with a porous structure so as to permit gas to pass through. However, inclusive of the material of the solid polymer membrane 14, the material and microzone structure of the membrane/electrode assembly (MEA) 18 composed including the fuel electrode 16a and an oxidant electrode 16b are not characteristic features of the invention, but may be produced through application of known art technology, and as such will not be described in detail.

In each unit cell 12, a fuel gas flow passage 23 for supplying fuel (hydrogen) is formed at the superposed faces of the membrane/electrode assembly 18 and the first separator 20. An oxidant gas flow passage 26 for supplying air (oxygen) is formed at the opposed faces of the membrane/electrode assembly 18 and the second separator 22. Between two adjacent unit cells 12 which by being stacked together make up the cell stack, at the opposed faces of the first separator 20 of one unit cell 12 and the second separator 22 of the other unit cell 12, is formed a coolant flow passage 28 for circulating coolant.

Additionally, in each unit cell 12, a fuel gas inlet 34a, a fuel gas outlet 34b, an oxidant gas inlet 34c, and an oxidant gas outlet 34d are situated at the tops and bottoms of a first side edge 30 and a second side edge 32 located in opposition in the horizontal direction when installed in the solid polymer electrolyte fuel cell 10, each of these apertures being formed perforating in the stacking direction. In particular, the fuel gas inlet 34a and the fuel gas outlet 34b are formed at generally opposing locations along one diagonal, and the oxidant gas inlet 34c and the oxidant gas outlet 34d are formed at generally opposing locations along the other diagonal.

In the approximately center portion of the first side edge 30 and the second side edge 32 in each unit cell 12 are respectively formed, at opposing locations in the horizontal direction, a coolant inlet 34e and a coolant outlet 34f that pass through in the stacking direction.

In each unit cell 12, the membrane/electrode assembly 18 is of rectangular plate shape slightly smaller than the first and second separators 20, 22.

By so doing, the fuel gas, oxidant gas, and coolant inlets and outlets 34a-34f are formed as through-holes at corresponding locations in the first and second separators 20, 22, at locations away from an outer peripheral side of the membrane/electrode assembly 18. In the solid polymer electrolyte fuel cell 10, the plurality of stacked unit cells 12 communicate with one another, with the fuel gas, oxidant gas, and coolant inlets and outlets 34a-34f formed with an overall configuration passing in the stacking direction through the cell stack that makes up the main body of the solid polymer electrolyte fuel cell 10.

While not explicitly shown in the drawings, as taught for example in JP-A-2002-83610, of the plurality of stacked unit cells 12 in the solid polymer electrolyte fuel cell 10, the first separator 20 of the unit cell 12 situated at a first end in the stacking direction and the second separator 22 of the unit cell 12 situated at the other end in the stacking direction have an anode collector and a cathode collector superposed thereon. The total power of the plurality of directly connected unit cells 12 is drawn out from these collectors. Additionally, against the outside faces of the anode collector and cathode collector are superposed, via appropriate insulating spacers (not shown) an anode retainer plate 36 and a cathode retainer plate 38. Also, while not explicitly shown in the drawings, the plurality of unit cells 12 in their entirety including the collectors and retainer plates of both poles, are fastened together in the stacking direction by means of fastening bolts passed therethrough at the four corners, and integrally secured to form solid polymer electrolyte fuel cell 10.

In the solid polymer electrolyte fuel cell 10, a fuel gas feed port 40a, a fuel gas discharge port 40b, an oxidant gas feed port 40c, an oxidant gas discharge port 40d, a coolant feed port 40e, and a coolant discharge port 40f, for a total of six ports 40a-40f, are formed in the anode retainer plate 36 and cathode retainer plate 38. These ports 40a-40f connect to the corresponding apertures of the fuel gas, oxidant gas, and coolant inlets and outlets 34a-34f formed communicating with one another in the plurality of stacked unit cells 12. External lines (not shown) are connected to the ports 40a-f so that fuel gas, oxidant gas, and coolant can be supplied to and discharged from the fuel gas, oxidant gas, and coolant inlets and outlets 34a-34f.

The fuel gas, oxidant gas, and coolant supplied to the inlets 34a, 34c, 34e through the feed ports 40a, 40c, 40e flows through the fuel gas flow passage 24 and the oxidant gas flow passage formed in an unit cell 12 described previously, and through the coolant flow passage 28 formed between unit cells 12, 12, and then through the outlets 34b, 34d, 34f, to be discharged through the discharge ports 40b, 40d, 40f.

By so doing, as in the known art, in the fuel electrode 16a disposed on the first separator 20 side of the solid polymer electrolyte membrane 14, the supplied fuel gas is ionized through catalyst action to supply electrons, while in the oxidant electrode 16b disposed on the second separator 22 side of the solid polymer electrolyte membrane 14, hydrogen ions transported through the solid polymer electrolyte membrane 14 react with oxidant gas (air) supplied from the outside and electrons fed back via an external electrical circuit, to produce water vapor, thereby functioning overall as a battery that exhibits power generating action.

In order to efficient and consistently exhibit the desired power generating action, it is necessary for fuel gas and oxygen gas to be supplied continuously to the catalyst electrodes 16a, 16b of the unit cells 12, and for coolant to be supplied continuously to the unit cells 12 in order to regulate temperature. Accordingly, a description regarding the flow passage construction forming the feed and discharge flow passages for the fuel gas, oxidant gas, and coolant is provided hereinbelow.

In this embodiment, identical metal separators 42 are employed as the first separator 20 and the second separator 22, as shown in FIGS. 3-6.

In preferred practice the metal separator 42 will be formed of metal material that, in addition to having good conductivity, has effective rigidity and corrosion resistance in oxidizing environments, for example, a stainless steel base material, optionally subjected to a surface treatment or used as a composite material with carbon or the like, to achieve the required characteristics at a high level. In order for the metal separator 42 to have the required rigidity and machining precision, it is formed by means of pressing, using a flat metal plate with generally uniform thickness (e.g. thickness of about 0.1 mm-0.5 mm).

Specifically, in the metal separator 42 are punched equal numbers of through-holes (in this embodiment, three on each side) 44a, 44b, 44c, 44d, 44e, 44f located at the first side edge 30 and the second side edge 32 which are situated on the same side when the unit cell 12 is assembled. The three through-holes 44a, 44e, 44d on the first side edge 30 and the three through-holes 44c, 44f, 44b on the second side edge 32 are formed with mutually symmetrical shape and locations. That is, when the metal separator 42 is inverted front to back about a center axis that is either a horizontal center axis extending on the horizontal through the center in the height direction of the metal separator 42 or a plumb-bob vertical axis extending vertically through the center in the lateral direction, the total of six through-holes 44a-44f will be positioned at the same locations of the side edges on the left and right sides. At the first side edge 30, the through-holes 44a, 44e, 44d are formed in that order from the top, and at the second side edge 32 the through-holes 44c, 44f, 44b are formed in that order from the top.

With this arrangement, even when the two metal separators 42, 42 are superposed inverted front to back, the three through-holes formed in each of the left and right edges will align and communicate with one another in the stacking direction. In this embodiment, the through-holes 44a, 44b, 44c, 44d, 44e, 44f respectively constitute the fuel gas inlet 34a, fuel gas outlet 34b, oxidant gas inlet 34c, oxidant gas outlet 34d, coolant inlet 34e, and coolant outlet 34f.

Figure 4:
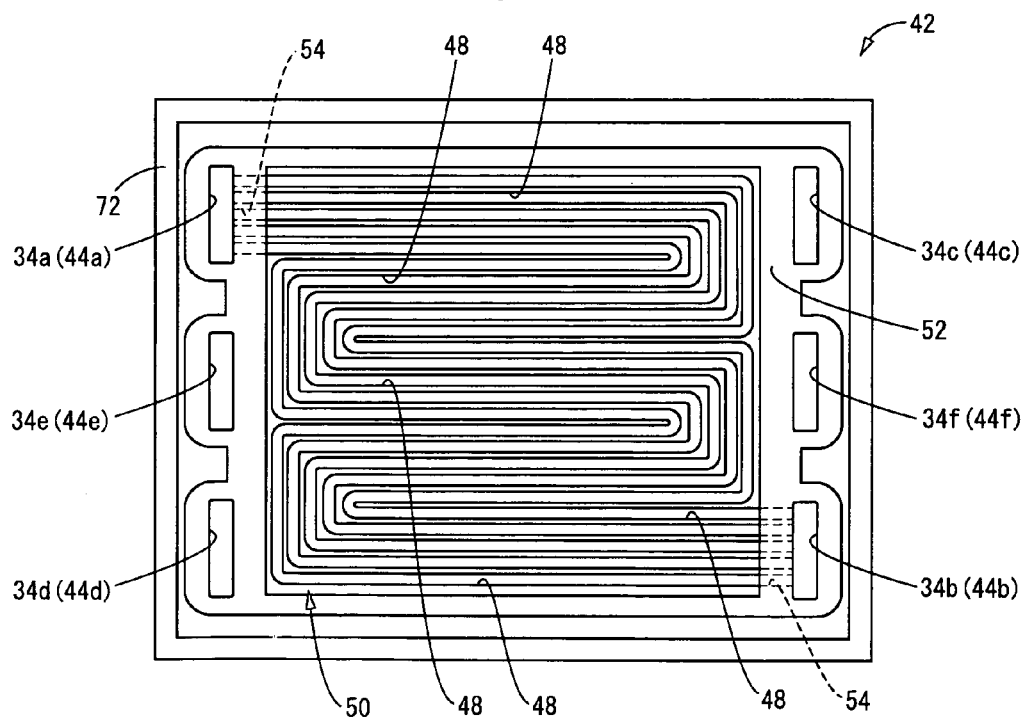
FIG. 4 is a side elevational view of the primary face of the separator provided of FIG. 3 with a seal rubber layer adhered thereto.

In the metal separator 42, as shown in FIG. 3 and FIG. 4, on the primary face thereof superposed against the fuel electrode 16a, there is formed a gas flow passage recess 48 that takes a sinuous path first extending in the horizontal direction from the proximity of the fuel gas inlet 34a formed at the upper left of the first side edge 30 and towards the second side edge 32, inflecting vertically downward in proximity to the second side edge 32 and extending slightly downward, making a U-turn and extending in the horizontal direction back towards the first side edge 30, inflecting vertically downward in proximity to the first side edge 30 and extending slightly downward, making another U-turn and again extending in the horizontal direction towards the second side edge 32, until finally reaching the fuel gas outlet 34b formed at the bottom right of the second side edge 32. This recess 48 connects one through-hole 44a to another through-hole 44b situated opposite in the generally diagonal direction; in this embodiment in particular, a plurality of recesses (five in this embodiment) are formed so as to extend parallel to one another. In preferred practice, linear segments of the recess 48 extending in the horizontal direction will be formed situated at generally equidistant intervals in the vertical direction of the primary face 46.

In this embodiment in particular, the recess 48 has a cross section of generally isosceles trapezoidal shape gradually constricting in width towards the bottom. In preferred practice, the recess 48 will have width of from 1.0 mm to 2.0 mm at the mouth, and from 0.5 mm to 1.5 mm at the bottom, and depth of from 0.3 mm to 1.2 mm. More preferably, it will have width of 1.6 mm at the mouth, width of 1.0 mm at the bottom, and depth of 0.7 mm. In a recess 48 composed of multiple grooves, the interval between neighboring recesses 48 will preferably be from 0.2 mm to 1.2 mm at the mouth, and more preferably 0.7 mm.

Figure 5:
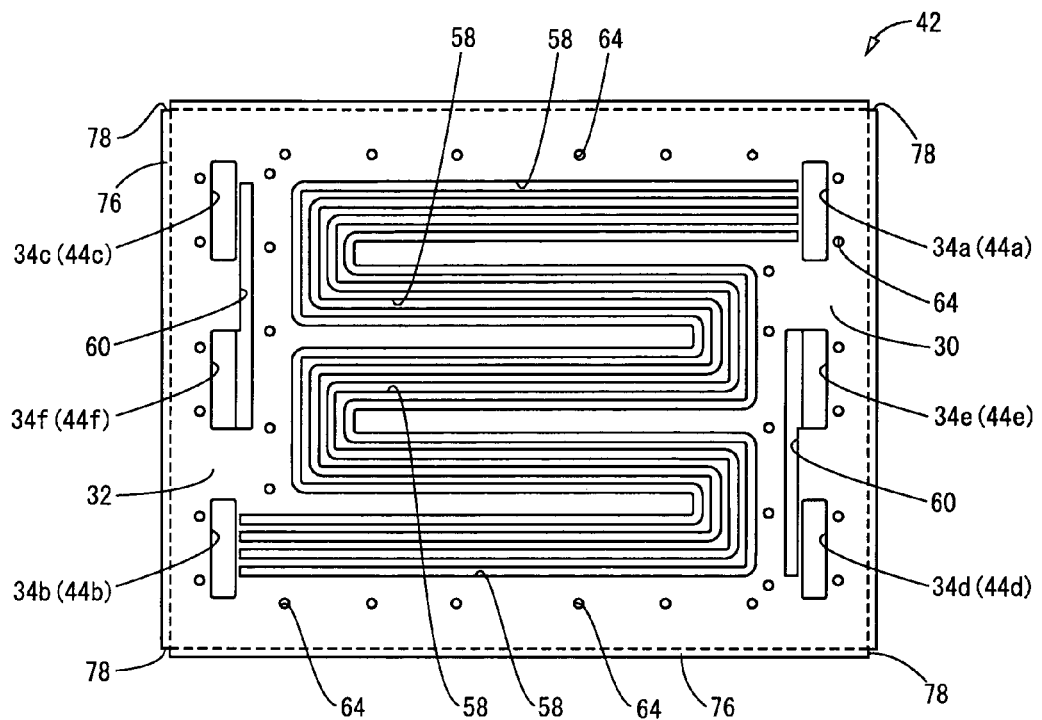
FIG. 5 is a side elevational view of a secondary face of the separator of FIG. 3.

On the primary face of the metal separator 42, the area formed by portions of the recess 48 excepting those portions connecting with the through holes 44a-44d constitutes a gas diffusion zone 50 for stacking against the membrane/electrode assembly 18. As shown in FIG. 5, around the perimeter of the gas diffusion zone 50, the primary face 46 of the metal separator 42 is covered by a primary face seal rubber layer 52 disposed surrounding the gas diffusion zone 50. In this embodiment, the vulcanization molded primary face seal rubber layer 52 is bonded to the primary face 46 of the metal separator 42 over the entire face thereof by means of vulcanization bonding, and adheres fluid-tightly to the metal separator 42. In the assembled state, the primary face seal rubber layers 52 formed covering the primary faces 46 of the first and second separators 20, 22 are placed in pressure contact with one another, thereby providing a fluid-tight seal to the gas diffusion zone 50. Additionally, the inside peripheral face of the primary face seal rubber layer 52 abuts against the outer peripheral face of the fuel electrode 16a or the oxidant electrode 16b, thereby positioning the membrane/electrode assembly 18 superposed to the metal separator 42 on the primary face 46 thereof. In this embodiment in particular, the inside peripheral face of the primary face seal rubber layer 52 is a sloping face, and the inside periphery of the primary face seal rubber layer 52 spreads out gradually moving away from the primary face 46 of the metal separator 42.

Additionally, on the primary face 46 of the metal separator 42, in portions of the recess 48 formed outside of the gas diffusion zone 50, i.e. connecting portions 54 serving as connecting recesses that are the portions connecting with the through holes 44a, 44b, 44c, 44d, the primary face seal rubber layer 52 extends thereover in a bridge configuration so as to cover the openings thereof. In other words, connecting portions 54 which are the connecting portions of the recesses 48 to the through-holes 44a-44d have a generally tunnel structure, by means of the openings of the recesses 48 being covered by the primary face seal rubber layer 52.

Figure 6:
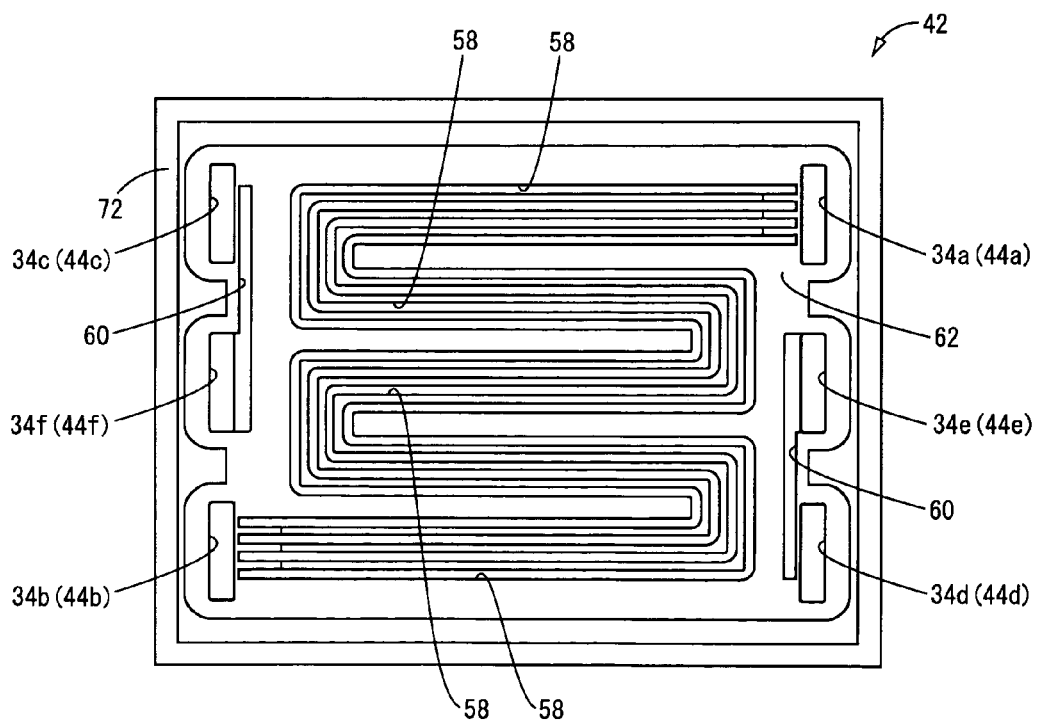
FIG. 6 is a side elevational view of the secondary face of the separator of FIG. 5 provided with a seal rubber layer adhered thereto.

On the secondary face of the metal separator 42 on the opposite side thereof from the primary face onto which the recess 48 opens, there is formed as recessed passage 58 serving as a coolant flow passage forming portion, as shown in FIGS. 5 and 6. The recessed passage 58 is formed on the secondary face 56 between the plurality of recesses 48 formed on the primary face 46, and extends from the proximity of the fuel gas inlet 34a to the proximity of the fuel gas outlet 34b. That is, the land portions between the recesses 48 on the primary face 46 are utilized as the recessed passage 58 on the secondary face 56 on the opposite side, and extend along the recesses 48 to just short of the oxidant gas inlet 34c and the oxidant gas outlet 34d.

A connecting recess 60 is formed in proximity to the coolant inlet 34e and the coolant outlet 34f. The connecting recess 60 connects at one end thereof to the coolant inlet 34e or the coolant outlet 34f, while the other end extends in proximity to the oxidant gas inlet 34c or the oxidant gas outlet 34d.

As shown in FIG. 6, on the secondary face 56 is formed a secondary face seal rubber layer 62 that covers substantially the entire face except the outer peripheral portion of the metal separator 42 and the bottom of the recess 48. On the inside face of the recessed passage 58, an insulating rubber layer 63 is integrally formed with the secondary face seal rubber layer 62 and covers the inside of the recessed passage 58. By so doing, the inside of the recessed passage 58 is electrically insulated from the outside along its entire lengthwise extension. In this embodiment in particular, the metal separator 42 is perforated by a plurality of connecting holes 64, and a seal rubber layer 66 is formed by means of physically unifying the primary face seal rubber layer 52 and the secondary face seal rubber layer 62 which adhere respectively to the primary face 46 and the secondary face 56 of the metal separator 42. This arrangement makes it possible to improve adhesive strength of the seal rubber layer 66, and to prevent improper filling of rubber material during molding of the thin seal rubber layer 66.

Figure 7:
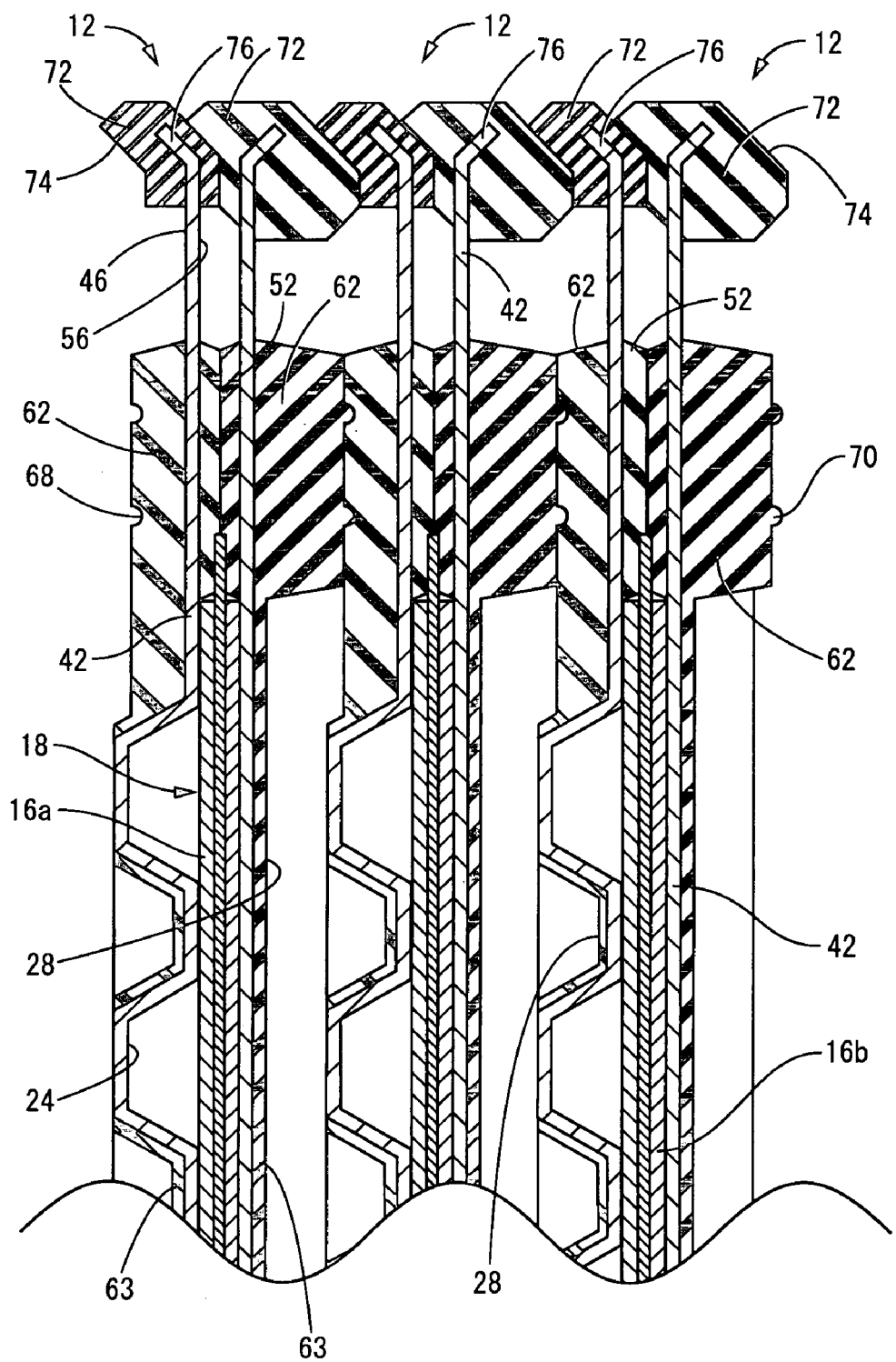
FIG. 7 is a cross sectional view showing unit sells being superposed on one another to form the solid polymer electrolyte fuel cell of FIG. 1.

In this embodiment, as shown in FIG. 7, a mating recess 68 is formed in a part of the secondary face seal rubber layer 62 that covers the metal separator 42 for stacking against the fuel electrode 16a, and a mating projection 70 is formed in part of the secondary face seal rubber layer 62 that covers the metal separator 42 for stacking against the oxidant electrode 16b. By means of mating the mating recess 68 and the mating projection 70, when unit cells 12 are stacked up to produce the cell stack, the unit cells 12 are positioned with respect to one another.

Additionally, as shown in FIG. 7, the outside of the seal rubber layer 66, i.e. the outside peripheral edge of the metal separator 42, is covered by an auxiliary seal rubber 72 extending over substantially the entire periphery. By means of the auxiliary seal rubber 72, sealing is provided between the metal separators 42 in the assembled state, preventing fuel gas, oxidant gas, or coolant from leaking to the outside in the unlikely event of a leak through the seal rubber layer 66. The two faces of the auxiliary seal rubber 72 on the primary face 46 side and the secondary face 56 side of the metal separator 42 are sloping faces that slope towards the primary face 46 from the secondary face 56 side, with the sloping face constituting a guide face 74. The slope angle of the guide face 74 is substantially the same on the primary face 46 side and the secondary face 56 side, and when metal separators 42 are superposed, the guide face 74 on the primary face 46 side and the guide face 74 on the secondary face 56 side are stacked on one another whereby the metal separators 42 may be easily positioned together.

In this embodiment in particular, the guide face 74 is a smooth face, which not only ensures a high level of sealing, but makes possible smooth positioning by means of juxtaposing the guide faces 74. As the means for producing smooth faces on the guide faces 74, it would be conceivable by way of specific examples to employ as the material for the auxiliary seal rubber 72 a self-lubricating rubber that incorporates oil or the like so that lubricant bleeds onto the surface, or alternatively to subject the surface to a laser treatment or coating with low-friction resin.

As shown in FIG. 7, the outside peripheral edge portion of the metal separator 42 covered by the auxiliary seal rubber 72 is sloped towards the secondary face 56 on the side opposite the primary face onto which the recesses 48 open, forming a reinforcing rib 76. The reinforcing rib 76 is formed extending substantially all the way around the edge portion at an angle of approximately 25-65° with respect to the plane of the metal separator 42, making it possible to increase the strength of the metal separator 42 as well to more securely attach the auxiliary seal rubber 72. In this embodiment in particular, notched portions 78 are formed in the four corners of the metal separator 42, which is configured as a generally rectangular plate. By means of the notched portion 78, the reinforcing ribs 76 of adjacent sides are mutually independent, thereby avoiding the occurrence of strain due to bending of the outside edges of the metal separator 42.

Metal separators 42 having the construction described above are superposed against the membrane/electrode assembly 18 from either side. Specifically, the membrane/electrode assembly 18 is constructed by juxtaposing the fuel electrode 16a and the oxidant electrode 16b against the solid polymer electrolyte membrane 14 and unifying them in the manner described previously. The solid polymer electrolyte membrane 14 is of rectangular shape slightly smaller than the metal separator 42, and the fuel electrode 16a and oxidant electrode 16b are of rectangular shape slightly smaller than the solid polymer electrolyte membrane 14. By so doing, the outside peripheral edges of the solid polymer electrolyte membrane 14 project out a predetermined width dimension from the outside peripheral edges of the fuel electrode 16a and oxidant electrode 16b, about the entire periphery. The projecting outside peripheral edges of the solid polymer electrolyte membrane 14 are then sandwiched between the first and second separators 20, 22, and the outside peripheral edges of the solid polymer electrolyte membrane 14 are held clamped about the entire periphery by the primary face seal rubber layers 52 which function as gaskets. By means of the pressure contact against the primary face seal rubber layers 52, a fluid tight seal is provided to the gas diffusion zones on the fuel electrode 16a side and the oxidant electrode 16b side with the membrane/electrode assembly 18 therebetween. In this embodiment in particular, the thickness dimension of the primary face seal rubber layer 52 on the first separator 20 is greater than the thickness dimension of the fuel electrode 16a, and the thickness dimension of the primary face seal rubber layer 52 on the second separator 22 is greater than the thickness dimension of the oxidant electrode 16b. As a specific example, in preferred practice, the thickness dimension of the fuel electrode 16a and the oxidant electrode 16b will be 0.25 mm, and the thickness of each of the primary face seal rubber layers 52 on the separators 20, 22 will be 0.275 mm. Also in preferred practice, the sum of the thickness dimensions of the primary face seal rubber layers 52 on the separators 20, 22 will be the same as or slightly greater than the total thickness of the membrane/electrode assembly 18, i.e. the sum of the thickness dimension of the solid polymer electrolyte membrane 14 and the thickness dimensions of the two fuel/oxidant electrodes 16a, 16b. Preferably, for example, the sum of the thickness dimensions of the primary face seal rubber layers 52 will be 0.55 mm, the thickness dimension of the fuel electrode 16a and the oxidant electrode 16b will be 0.25, and the thickness dimension of the solid polymer electrolyte membrane 14 will be 0.05 mm.

Figure 8:
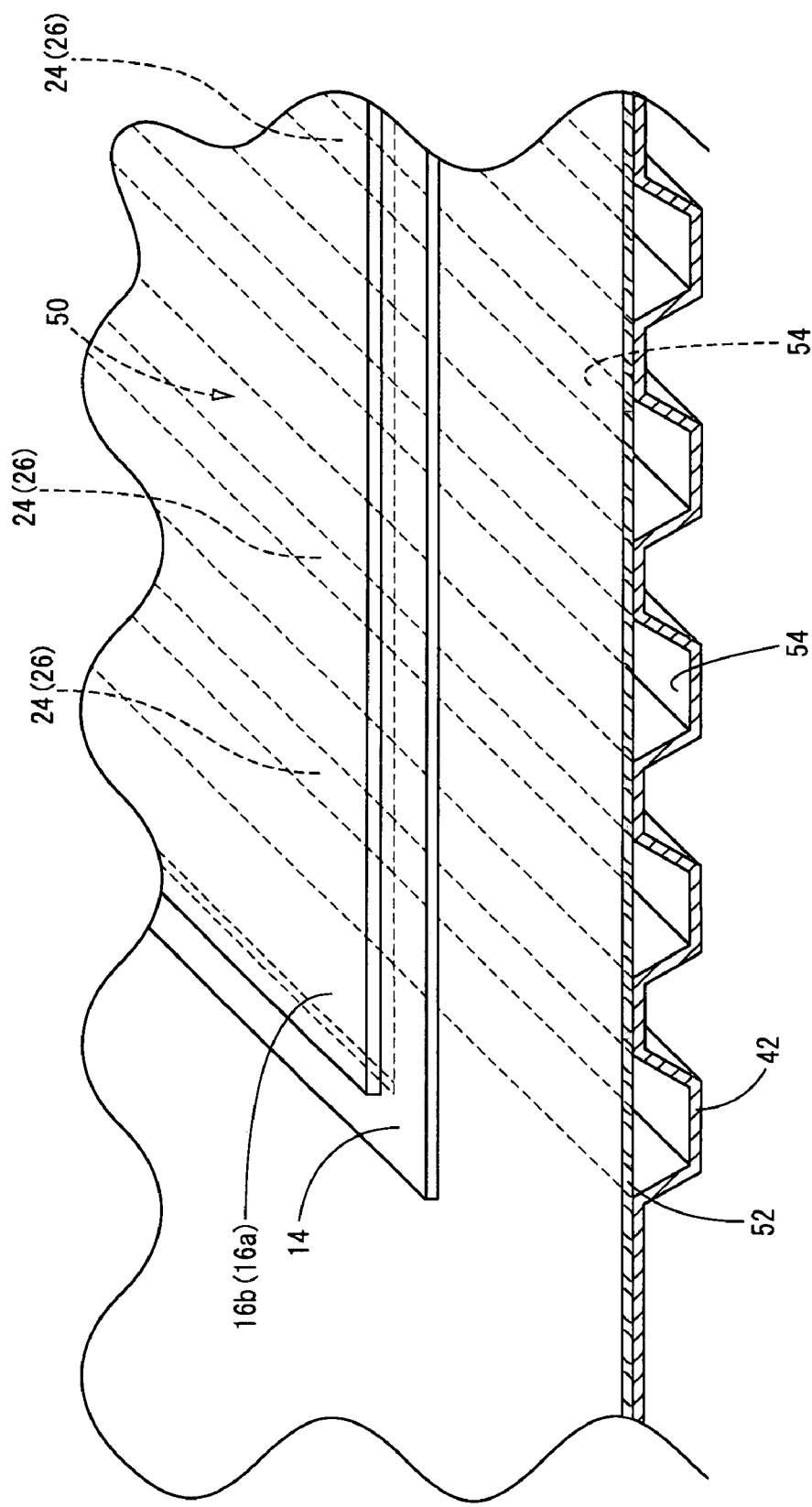
FIG. 8 is an fragmentary enlarged view of the separator of FIG. 4.

At the openings of the connecting portions 54, the primary face seal rubber layers 52 are not sufficiently clamped between the first and second separators 20, 22 due to the presence of connecting portions 54, and accordingly the solid polymer electrolyte membrane 14, which is intended to be held clamped between the primary face seal rubber layers 52, is not sufficiently clamped either. As a result, there is a risk that the extremely thin solid polymer electrolyte membrane 14 may sag into the connecting portions 54 at the openings of the connecting portions 54. Accordingly there is a danger that a gas leak may occur due to fuel gas/oxidant gas intended to be supplied from the fuel gas inlet 34a/oxidant gas inlet 34c to the fuel gas flow passage 24/oxidant gas flow passage 26 via the connecting portions 54 being drawn through the sag and into the gas diffusion zone or the fuel gas flow passage 24/oxidant gas flow passage 26 on the opposite side of the membrane/electrode assembly 18. Accordingly, in this embodiment in particular, as shown in FIG. 8, the primary face seal rubber layer 52 is disposed bridging over the openings of the connecting portions 54. With this arrangement, sagging of the solid polymer electrolyte membrane 14 can be prevented, and gas leaks of the sort described above can be prevented.

The metal separators 42 are superposed at their primary faces 46, 46 against the membrane/electrode assembly 18. Specifically, the first and second separators 20, 22 used as the two metal separators for stacking against either side of the membrane/electrode assembly 18 are assembled flipped front to back with respect to one another. That is, the first separator 20 is superposed against the fuel electrode 16a with the fuel gas inlet 34a formed at upper left and the fuel gas outlet 34b formed at lower right connected by means of a recess 48. On the other hand, flipping the first separator 20 front to back allows it to be used as the second separator 22 superposed against the oxidant electrode 16b, with the oxidant gas inlet 34c formed at upper right and the oxidant gas outlet 34d formed at lower left connected by means of a recess 48.

In the unit cell 12 produced by juxtaposing the first separator 20 and the second separator 22 against the membrane/electrode assembly 18 from both sides, the opening of the recess 48 which opens onto the primary face 46 of the first separator 20 superposed against the fuel electrode 16a is covered by the fuel electrode 16a, thereby forming a fuel gas flow passage 24 between the fuel electrode 16a and the primary face 46 of the first separator 20. On the other hand, the opening of the recess 48 which opens onto the primary face 46 of the second separator 22 superposed against the oxidant electrode 16b is covered by the oxidant electrode 16b, thereby forming the oxidant gas flow passage 26 between the oxidant electrode 16b and the primary face 46 of the second separator 22. By means of sealing with the solid polymer electrolyte membrane 14 held clamped between the primary face seal rubber layers 52, 52 formed covering the first and second separators 20, 22 in the manner described above, gas leakage past the membrane/electrode assembly 18 between the fuel gas flow passage 24 and the oxidant gas flow passage 26 to either side of the membrane/electrode assembly is prevented.

Figure 9:
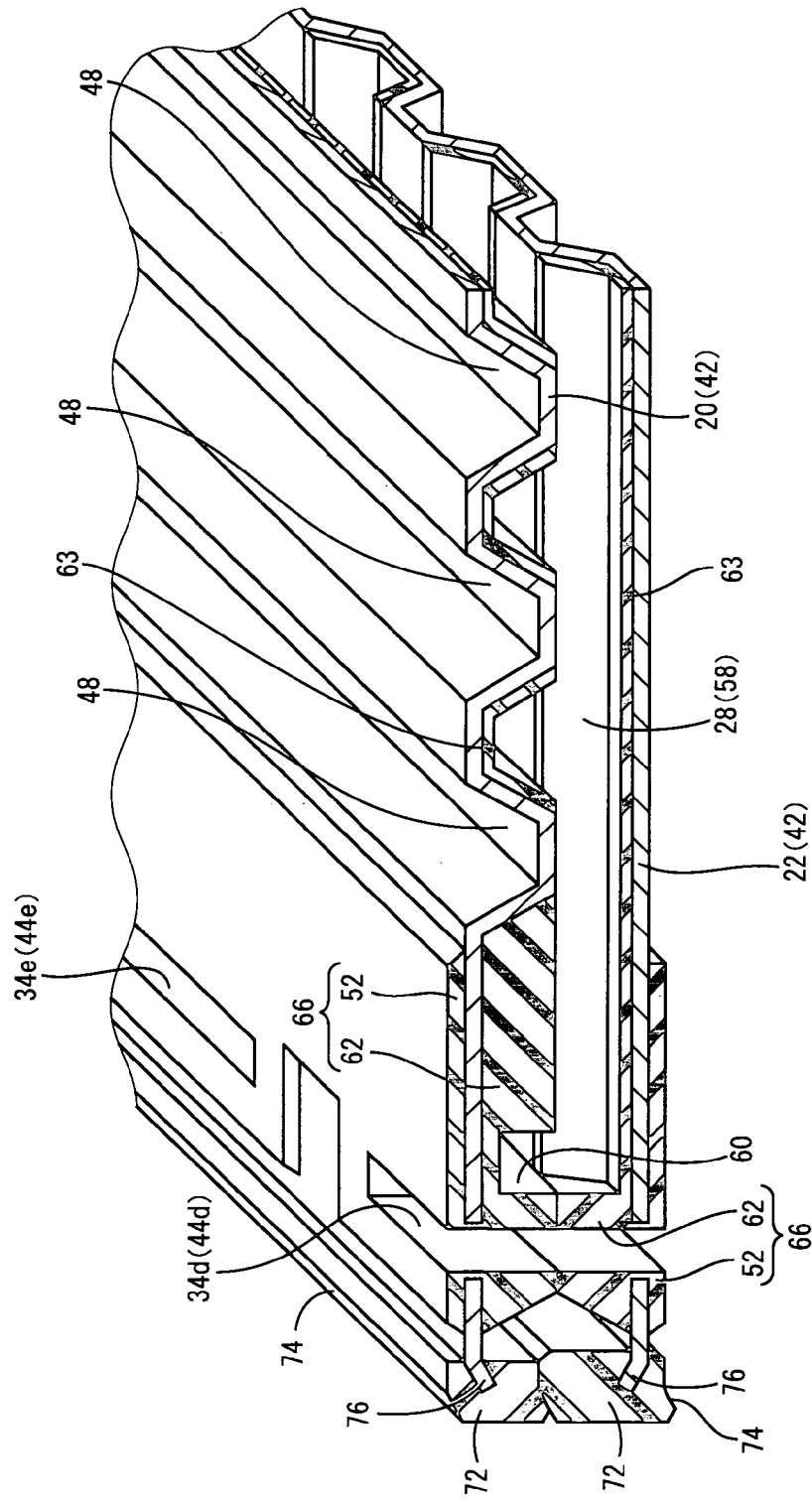
FIG. 9 is an enlarged part cross sectional perspective view showing the secondary face sides of the separators of FIGS. 4 and 6 being superposed together on each other.

Additionally, by stacking together a number of such unit cells 12 with the secondary faces 56 of the metal separators 42 superposed against one another, the opening of the recessed passage 58 formed in the secondary face 56 of a metal separator 42 is covered by another metal separator 42, forming a coolant flow passage 28 between the secondary faces 56 of the metal separators 42. Specifically, as shown in FIG. 9, in recessed passages 58, 58 formed in the secondary faces 56 of metal separators 42 superposed against one another, in some portions the coolant flow passage 28 is formed by the recessed passages 58, 58 superposed with one another, while in other portions the coolant flow passage 28 is formed by the opening of the recessed passage 58 in one metal separator 42 being covered by the bottom of the recess 48 of the other membrane/electrode assembly 42.

Additionally, part of the connecting recess 60 formed in one of the metal separators 42 is superposed with the end of the recessed passage 58 formed in another metal separator 42, and connects with it in the stacking direction. By means of this, with the secondary faces 56 of the metal separators 42 superposed, the two ends of the coolant flow passage 28 formed in one of the metal separators 42 are placed in communication respectively with the coolant inlet 34e and the coolant outlet 34f via the connecting recess 60 formed in the one metal separator 42, whereby coolant supplied from the coolant inlet 34e flows through the coolant flow passage 28 and is discharged from the coolant outlet 34f.

The coolant flow passage 28 is covered over the entire lengthwise extension of the flow passage inner face by the insulating rubber layer 63, but at the bottom of the recess 48 is not covered by the secondary face seal rubber layer 62, so that there is electrical continuity between the first separator 20 and the second separator 22 in portions where the bottoms of recesses 48 are placed in direct abutment. Thus, there is electrical continuity among unit cells 12 whereby the total voltage produced by the unit cells 12 can be drawn out via the anode collector and the cathode collector, while the coolant flow passage 28 is electrically insulated so that dissipation into the coolant of the power generated by the unit cells 12 is prevented.

As shown in FIG. 2 or FIG. 8, in the unit cell 12 for the solid polymer electrolyte fuel cell of construction according to this embodiment, the solid polymer electrolyte membrane 14 is of planar shape slightly larger than the fuel electrode 16a and the oxidant electrode 16b, with the entire outer peripheral edge portion of the solid polymer electrolyte membrane 14 projecting out beyond the outer peripheral edges of the fuel electrode 16a and the oxidant electrode 16b. The first separator 20 and second separator 22 have planar shape slightly larger than the solid polymer electrolyte membrane 14. The primary face 46 of the first separator 20 and the second separator 22 is covered by the primary face seal rubber layer 52 surrounding the portion for stacking against the fuel electrode 16a or the oxidant electrode 16b. Accordingly, by sandwiching the membrane/electrode assembly 18 from either side between the primary faces 46, 46 of the first separator 20 and the second separator 22, the solid polymer electrolyte membrane 14 projecting out beyond the electrodes 16a, 16b is held clamped fluid-tightly around the entire periphery, by means of the inner peripheral portions of the primary face seal rubber layers 52, 52. Thus, in the gas diffusion zone 50, high levels of sealing are possible on the side where the fuel as flow passage 24 is formed and the side where the oxidant gas flow passage 26 is formed, to either side of the membrane/electrode assembly 18.

In this embodiment, metal separators 42 are used as the first and second separators 20, 22. With this arrangement, it is possible to make the first and second separators 20, 22 sufficiently thin, while assuring adequate strength. Thus, it is possible to reduce the thickness of the unit cells 12, and to achieve more compact size of the cell stack composed of the unit cells, and thus of the solid polymer electrolyte fuel cell 10. Additionally, by means of forming the reinforcing rib around the entire outer peripheral edge of the metal separator 42, the strength of the metal separator 42 can be increased further, and a thinner metal separator 42 can be achieved more advantageously.

Further, by forming the first and second separators 20, 22 using metal which has superior conductivity to conductive resins and carbon, a high performance solid polymer electrolyte fuel cell 10 can be realized easily. Also, since metal has a much higher heat resistance temperature than resins or carbon, even if place d in a solid polymer electrolyte fuel cell 10 that produces an exothermic reaction, it is possible to avoid problems such as heat induced deformation and shrinkage. Additionally, metal separators 42 are easily reused by being recycled.

The primary face seal rubber layer 52 formed on the primary face 46 and the secondary seal rubber layer 62 formed on the secondary face 56 are unified by being physically connected by means of the connecting holes 64. By means of this the adhesive strength of the seal rubber layer 66 to the metal separator 42 can be increased, and the rubber material can be spread nicely over the separator surface during molding of the seal rubber layer 66, preventing the occurrence of defective products.

Further, in this embodiment, secondary face seal rubber layers 62 cover the secondary faces 56 of both the first separator 20 and the second separator 22, and the insulating rubber layer 63 is integrally formed with the secondary face seal rubber layer 62. With this arrangement, between the secondary faces 56, 56 of the first separator 20 and the second separator 22 there is formed a coolant flow passage 28 that is insulated by means of the insulating rubber layer 63 integrally formed with the secondary face seal rubber layer 62. Thus, temperature regulation of the solid polymer electrolyte fuel cell 10 can be carried out easily and reliably by means of circulating coolant through the coolant flow passage 28, and the coolant flow passage 28 can be insulated so as to prevent the power generated by the unit cells 12 from dissipating into the coolant.

Additionally, the primary face seal rubber layer 52 is formed extending in a bridge configuration so as to cover the openings of the connecting portions 54 connecting the recesses 48 with the through-holes 44a-44d. Thus, it is possible to avoid sagging of the solid polymer electrolyte membrane 14 at the openings of the connecting portions 54, resulting in fuel gas leaking to the oxidant electrode 16b side or oxidant gas leaking to the fuel electrode 16a side. Since the primary face seal rubber layer 52 formed so as to cover the openings of the connecting portions 54 is affixed to the metal separator 42 at both lateral edges of the recess 48, compressive force during sealing is advantageously assured not only by simple elasticity in the shear direction, but also by elasticity in the tensile direction.

By disposing the outer peripheral edges of the fuel electrode 16a and the oxidant electrode 16b in abutment with the inner peripheral edges of the primary face seal rubber layers 52 formed covering the primary faces 46 of the first separator 20 and the second separator 22, it is possible to position the membrane/electrode assembly 18 on the primary faces 46 of the first separator 20 and the second separator 22. Additionally, by constituting the inner peripheral edge of the primary face seal rubber layer 52 as a sloping face that gradually opens out moving away from the separator covered by the primary seal rubber layer 52, when juxtaposing the first and second separators 20, 22 against the membrane/electrode assembly 18 to produce a unit cell 12, the membrane/electrode assembly 18 can be positioned more easily on the primary faces 46 of the first and second separators 20, 22, and process efficiency can be improved.

In this embodiment, the first separator 20 and the second separator 22 are constituted as common metal separators 42 which are flipped front to back. Thus, it is possible to reduce the number of parts and to simply the production equipment, and accordingly to facilitate production and management of components.

Since the recess 48 has a shape extending in sinuous configuration, the fuel gas flow passage 24 and the oxidant gas flow passage 26 formed by the recess 48 can be formed over substantially the entire gas diffusion zone 50. Thus, fuel gas or oxidant gas can efficiently be made to contact the fuel electrode 16a or the oxidant electrode 16b.

Additionally, the peaks and valleys produced on the secondary face 56 of the metal separator by means of forming the recess 48 can be utilized to form the recessed passage 58. By so doing, the coolant flow passage 28 constituted by the recessed passage 58, like the fuel gas flow passage 24 and the oxidant gas flow passage 26, can be formed over a wide area on the metal separator 42, so that efficient cooling can be achieved.

Figure 10:
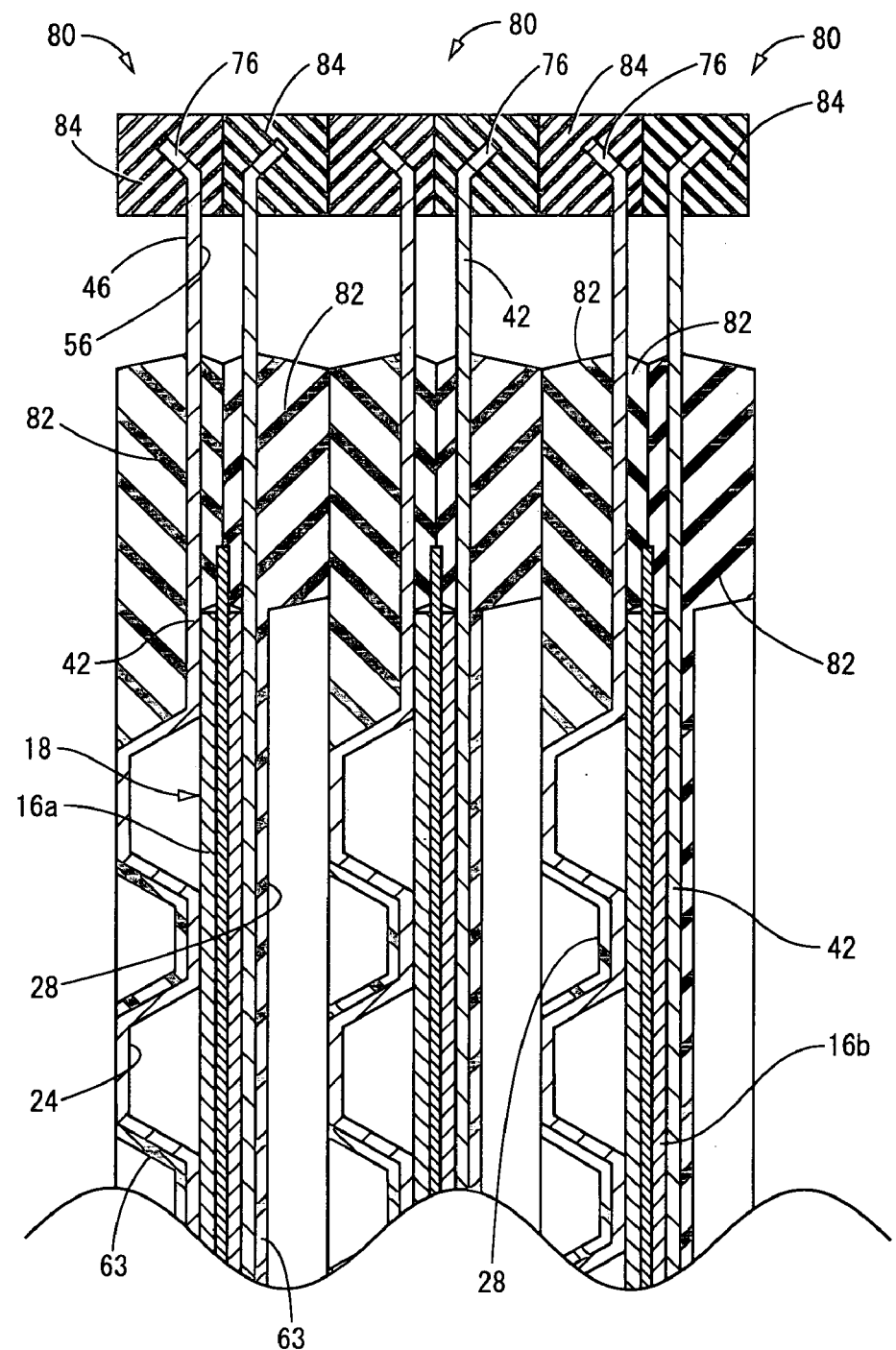
FIG. 10 is a cross sectional view of unit cells each including a cell according to a second embodiment of the invention, where the unit cells are superposed together.

Referring next to FIG. 10, the unit cell 80 of a solid polymer electrolyte fuel cell as a second embodiment of the invention is shown in the assembled state. In the following description, components are parts substantially identical to those of the first embodiment are assigned the same symbols as the first embodiment in the drawing, and are not described in any detail.

Specifically, in the second embodiment of the invention, the seal rubber layer 82 and auxiliary seal rubber 82 formed on the plurality of metal separators 42 making up the unit cell 80 have substantially identical shape. Specifically, for example, the mating recess 68 and the mating projection 70 provided to the seal rubber layer 82 in the first embodiment are not provided to the seal rubber layer 82 in the second embodiment, and the auxiliary seal rubber 84 has a generally square shape without sloping faces.

In the cell for the solid polymer electrolyte fuel cell of construction according to the second embodiment, since the shape is identical when flipped front to back, it is possible for the procedure of stacking unit cells 80 to make a solid polymer electrolyte fuel cell to be carried out more efficiently.

Even where the metal separator is covered with a seal rubber layer 82 and an auxiliary seal rubber 84, by flipping it front to back, it is possible to use either the first separator 20 or the second separator 22. Thus, it is possible to more advantageously achieve standardization of parts for the first separator 20 and the second separator 22, so that more efficient operations during assembly may be achieved.

While the presently preferred embodiments of this invention have been described in detail, for illustrative purpose only, it is to be understood that the present invention is not limited to the details of the illustrated embodiments.

For instance, while there were described examples of employing metal separators as the first separator 20 and the second separator 22 in the preceding embodiments, the material of the first separator 20 and the second separator 22 is not limited to that of the preceding embodiments. As specific examples, it would be possible to use parts fabricated of carbon or conductive resin material.

The recesses 48 formed in the first and second separators 20, 22 will in preferred practice extend in a sinuous configuration as in the preceding examples, but need not necessary have such a configuration.

The cross sectional shape of the recess 48 is not limited in any way to the shape taught in the embodiments. As a specific example, a recess with a rectangular cross section could be employed.

In the preceding embodiments, the coolant flow passage 28 is formed using the peaks and valleys formed by the recesses 48 on the secondary faces 56 of the first and second separators 20, 22, but it is not necessary to use these peaks and valleys to form the coolant flow passage 28. Additionally, it is not necessary for flow passages to extend with substantially unchanging cross section, it being sufficient for the passage to connect the coolant inlet 34e and the coolant outlet 34f on the secondary face so that coolant can flow between them.

The fuel gas inlet 34a oxidant gas inlet 34c connected by the recesses 48, or the coolant inlet 34e and the coolant outlet 34f connected by the coolant flow passage 28, need not be limited to one of each. Specifically, it would be possible to form a plurality of inlets and outlets, in which case a plurality of flow passages would be formed to connect the openings.

In the preceding embodiments, notched portions were provided in the corners of the first and second separators 20, 22, but it is not necessary to provide such notched portions. Additionally, it is not necessary to provide the reinforcing ribs 76 disposed on the outer peripheral edges of the first and second separators 20, 22. Nor is it necessary to provide the auxiliary rubber 72, 84 covering the reinforcing rib 76. By dispensing with formation of the auxiliary rubber 72, 84, and also dispensing with formation of the mating recess 68 and the mating projection 70 in the secondary face seal rubber layer 62, it is possible to realize the first and second separators 20, 22 as separators of substantially identical shape, whereby handling and assembly procedures may be carried out more efficiently.

In this embodiment, the secondary face seal rubber layer 62 is not formed on the bottom of the recess 48. However, it would be possible for the bottom of the recess 48 to also be covered by the secondary face seal rubber layer 62, except in portions where the bottoms of recesses 48 are in direct abutment. By so doing, the coolant passage 28 can be provided with a higher level of insulation, diffusion of power into the coolant can be effectively prevented, and the efficiency of the solid polymer electrolyte fuel cell can be improved.

What is claimed is:

1. A cell for use in a solid polymer electrolyte fuel cell comprising:
   a membrane electrode assembly including a fuel electrode and an oxidant electrode disposed on either side of a solid polymer electrolyte membrane, the assembly being sandwiched from either side by a first separator and a second separator to give a stacked construction;
   a fuel gas flow passage formed between opposed faces of the fuel electrode and the first separator; and
   an oxidant gas flow passage formed between opposed faces of the oxidant electrode and the second separator,
   wherein the solid polymer electrolyte membrane in the membrane electrode assembly has a planar shape slightly larger than the fuel electrode and the oxidant electrode so that an entire perimeter of an outer peripheral edge portion of the solid polymer electrolyte membrane projects outwardly beyond outer peripheral edges of the fuel electrode and the oxidant electrode,
   wherein the first separator and the second separator have a planar shape larger than the solid polymer electrolyte membrane, with primary face seal rubber layers integrally formed with outer peripheral edge portions of primary faces of the first and second separators superposed against the membrane electrode assembly, whereby the outer peripheral edge portion of the solid polymer electrolyte membrane projecting outwardly beyond the fuel electrode and the oxidant electrode are held clamped fluid-tightly between the first and second separators by means of inner peripheral portions of the primary face seal rubber layers of the first and second separators, and
   wherein the first separator and the second separator are metal separators, with the primary face seal rubber layers being vulcanization bonded to the metal separators, respectively.

2. A cell for use in a solid polymer electrolyte fuel cell according to claim 1, wherein at least one of the first separator and the second separator includes a secondary face seal rubber layer affixed to a secondary face on a back side from the primary face, and a plurality of connecting holes formed penetrating through the thickness of the at least one of the first separator and the second separator so that the primary face seal rubber layer and the secondary face seal rubber layer are linked and unified through the connecting holes.

3. A cell for use in a solid polymer electrolyte fuel cell according to claim 2, wherein the secondary face seal rubber layer is formed on both the first separator and the second separator; on the secondary faces of the first and second separators is formed a coolant flow passage forming portion for forming a coolant flow passage by means of being superposed to one another; and an insulating rubber layer that covers a surface of the coolant flow passage forming portion is formed integrally joined to the secondary face seal rubber layer.

4. A cell for use in a solid polymer electrolyte fuel cell according to claim 1, wherein at least one of the first separator and the second separator includes a recess extending to open onto the primary face, with the recess covered by the fuel electrode or the oxidant electrode of the membrane electrode assembly to form the fuel gas flow passage or the oxidant gas flow passage; an end of the gas flow passage or the oxidant gas flow passage is extended outwardly beyond the outer peripheral edge portion of the solid polymer electrolyte membranes of the membrane electrode assembly to form a connecting recess connected with fuel gas or oxidant gas inlets and outlets formed perforating the first separator and the second separator in a stacking direction; and the primary face seal rubber layer is formed so as to extend continuously in a recess width direction straddling the opening of the connecting recess to give the connecting recess a tunnel structure.

5. A cell for use in a solid polymer electrolyte fuel cell according to claim 1, wherein at least one of the outer peripheral edges of the fuel electrode and the oxidant electrode in the membrane electrode assembly are abutted by the inner peripheral portions of the primary face seal rubber layer formed on at least one of the primary face of the first separator and the second separator, so as to be aligned with one other in an opposed face direction orthogonal to a stacking direction of at least one of the first separator and the second separator against the membrane electrode assembly.

6. A cell for use in a solid polymer electrolyte fuel cell according to claim 5, wherein an end face of the inner peripheral portion of the primary face seal rubber layer is constituted as a sloping guide face sloping out towards an outer peripheral side of at least one of the first separator and the second separator going further away from the primary face of at least one of the first separator and the second separator.

* * * * *